United States Patent
Glejbol

(10) Patent No.: US 9,395,022 B2
(45) Date of Patent: Jul. 19, 2016

(54) UNBONDED FLEXIBLE PIPE

(75) Inventor: Kristian Glejbol, Glostrup (DK)

(73) Assignee: NATIONAL OILWELL VARCO DENMARK I/S, Brondby (DK)

( * ) Notice: Subject to any disclaimer, the term of this patent is extended or adjusted under 35 U.S.C. 154(b) by 591 days.

(21) Appl. No.: 13/697,041

(22) PCT Filed: May 12, 2011

(86) PCT No.: PCT/DK2011/050162
§ 371 (c)(1),
(2), (4) Date: Jan. 23, 2013

(87) PCT Pub. No.: WO2011/141033
PCT Pub. Date: Nov. 17, 2011

(65) Prior Publication Data
US 2013/0112307 A1    May 9, 2013

(30) Foreign Application Priority Data
May 12, 2010  (DK) .................................. 2010 00420

(51) Int. Cl.
*F16L 11/00* (2006.01)
*F16L 55/18* (2006.01)
(Continued)

(52) U.S. Cl.
CPC ............... *F16L 11/00* (2013.01); *F16L 11/083* (2013.01); *F16L 11/16* (2013.01); *F16L 55/18* (2013.01); *F16L 59/153* (2013.01); *Y10T 137/0402* (2015.04)

(58) Field of Classification Search
CPC ......... F16L 11/00; F16L 11/083; F16L 11/16; F16L 11/04; F16L 11/045; F16L 2011/047; F16L 59/153; F16L 9/12; F16L 9/121; F16L 9/123; B29D 23/001

USPC .......................... 138/129, 131, 134, 137–139
See application file for complete search history.

(56) References Cited

U.S. PATENT DOCUMENTS 1,053,394 A * 2/1913 Hubbell ..................... F16C 1/26
                                                    138/134
2,086,263 A * 7/1937 Fischer ...................... F16C 1/26
                                                    138/134
(Continued)

FOREIGN PATENT DOCUMENTS

CN          2795605 Y      7/2006
CN        200955632 Y     10/2007
(Continued)

OTHER PUBLICATIONS

API specification 17 J "Specification for unbonded flexible pipe", second edition, published by American Petroleum Institute; Jul. 16, 2008.

*Primary Examiner* — J. Casimer Jacyna
(74) *Attorney, Agent, or Firm* — Pearne & Gordon LLP

(57) ABSTRACT

The invention relates to a unbonded flexible pipe and a method for manufacturing such pipe. The unbonded flexible pipe has a length and a center axis along its length, and comprises an internal sealing sheath around its center axis, a carcass arranged inside the internal sealing sheath, and at least one armor arranged around the internal sealing sheath. The carcass comprises at least one helically wound elongate carcass reinforcement element providing a plurality of carcass reinforcement element windings along the length of the pipe wherein the carcass reinforcement element windings surround and/or are surrounded by a polymer structure, which polymer structure locks said carcass reinforcement element windings relative to each other. Accordingly the carcass reinforcement element windings need not be directly interlocked with each, but are mainly or totally locked to each other by the polymer structure.

32 Claims, 10 Drawing Sheets

(51) Int. Cl.
*F16L 11/08* (2006.01)
*F16L 11/16* (2006.01)
*F16L 59/153* (2006.01)

(56) References Cited

U.S. PATENT DOCUMENTS

| | | | |
|---|---|---|---|
| 2,092,898 A * | 9/1937 | Tondeur | F16C 1/26 138/131 |
| 2,126,955 A * | 8/1938 | Gleason | F16C 1/26 464/174 |
| 3,311,133 A | 3/1967 | Kinander | |
| 3,687,169 A * | 8/1972 | Reynard | F16L 11/16 138/134 |
| 3,771,570 A * | 11/1973 | Coleman | F16L 11/16 138/131 |
| 3,858,616 A | 1/1975 | Thiery et al. | |
| 3,916,723 A * | 11/1975 | Hawtree | F16C 1/226 138/131 |
| 4,167,953 A * | 9/1979 | Carlstrom | F16L 9/123 138/133 |
| 4,213,485 A * | 7/1980 | Ottewell | E21B 17/20 138/130 |
| 4,549,581 A | 10/1985 | Unno et al. | |
| 4,706,713 A | 11/1987 | Sadamitsu et al. | |
| 4,727,909 A | 3/1988 | Griffiths | |
| 5,213,637 A | 5/1993 | Mallen Herrero et al. | |
| 5,407,744 A | 4/1995 | Mallen Herrero et al. | |
| 5,601,893 A | 2/1997 | Strassel et al. | |
| 5,645,109 A | 7/1997 | Herrero et al. | |
| 5,669,420 A | 9/1997 | Herrero et al. | |
| 5,730,188 A | 3/1998 | Kalman et al. | |
| 5,813,439 A | 9/1998 | Herrero et al. | |
| 5,837,083 A | 11/1998 | Booth | |
| 5,922,149 A | 7/1999 | Mallen Herrero et al. | |
| 6,016,847 A | 1/2000 | Jung et al. | |
| 6,065,501 A | 5/2000 | Feret et al. | |
| 6,085,799 A | 7/2000 | Kodaissi et al. | |
| 6,123,114 A | 9/2000 | Seguin et al. | |
| 6,145,546 A | 11/2000 | Hardy et al. | |
| 6,192,941 B1 | 2/2001 | Mallen-Herrero et al. | |
| 6,253,793 B1 | 7/2001 | Dupoiron et al. | |
| 6,282,933 B1 | 9/2001 | Dupoiron | |
| 6,283,161 B1 | 9/2001 | Feret et al. | |
| 6,291,079 B1 | 9/2001 | Mallen Herrero et al. | |
| 6,354,333 B1 | 3/2002 | Dupoiron et al. | |
| 6,382,681 B1 | 5/2002 | Berton et al. | |
| 6,390,141 B1 | 5/2002 | Fisher et al. | |
| 6,408,891 B1 | 6/2002 | Jung et al. | |
| 6,415,825 B1 | 7/2002 | Dupoiron et al. | |
| 6,454,897 B1 | 9/2002 | Morand | |
| 6,516,833 B1 | 2/2003 | Witz et al. | |
| 6,668,867 B2 | 12/2003 | Espinasse et al. | |
| 6,691,743 B2 | 2/2004 | Espinasse | |
| 6,739,355 B2 | 5/2004 | Glejbol et al. | |
| 6,840,286 B2 | 1/2005 | Espinasse et al. | |
| 6,889,717 B2 | 5/2005 | Coutarel et al. | |
| 6,889,718 B2 | 5/2005 | Glejbol et al. | |
| 6,904,939 B2 | 6/2005 | Jung et al. | |
| 6,978,806 B2 | 12/2005 | Glejbol et al. | |
| 6,981,526 B2 | 1/2006 | Glejbol et al. | |
| 7,032,623 B2 | 4/2006 | Averbuch et al. | |
| 7,311,123 B2 | 12/2007 | Espinasse et al. | |
| 7,459,033 B2 | 12/2008 | Asahi et al. | |
| 7,487,803 B2 | 2/2009 | Lokere et al. | |
| 2003/0102044 A1 | 6/2003 | Coutarel et al. | |
| 2004/0168521 A1* | 9/2004 | Andersen | 73/807 |
| 2010/0089481 A1* | 4/2010 | Bectarte | F16L 11/16 138/130 |

FOREIGN PATENT DOCUMENTS

| | | |
|---|---|---|
| GB | 1404394 A | 8/1975 |
| WO | 0161232 A1 | 8/2001 |
| WO | 02095281 A1 | 11/2002 |
| WO | 2005043020 A1 | 5/2005 |
| WO | 2006097112 A2 | 9/2006 |
| WO | 2008025893 A1 | 3/2008 |
| WO | 2008077409 A1 | 7/2008 |
| WO | 2008077410 A1 | 7/2008 |
| WO | 2009024156 A2 | 2/2009 |

* cited by examiner

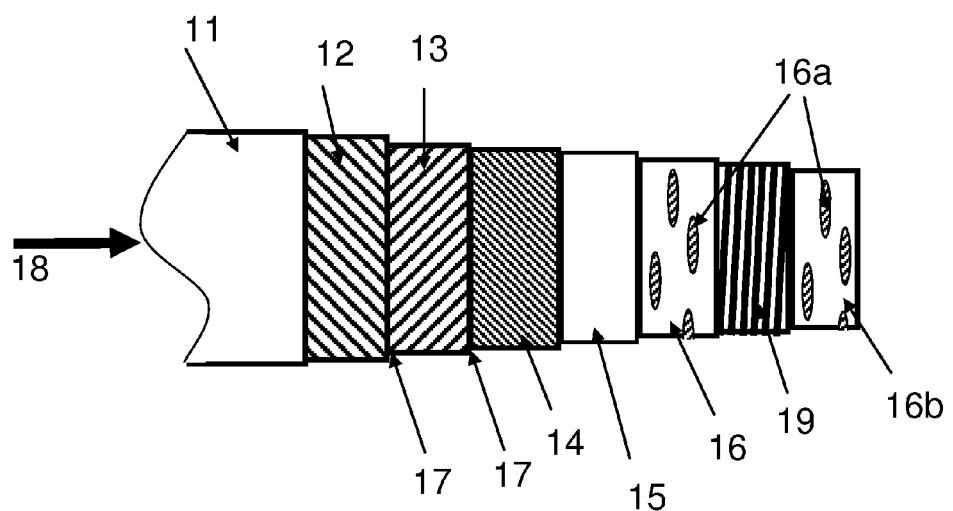

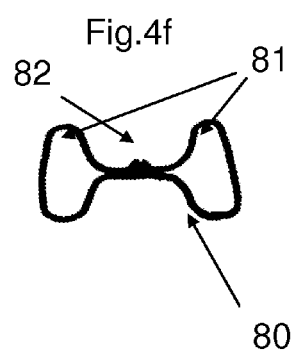
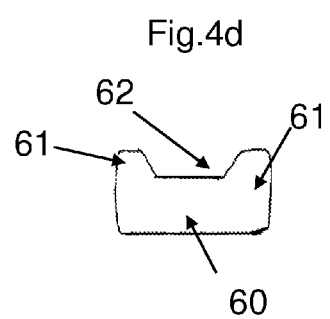
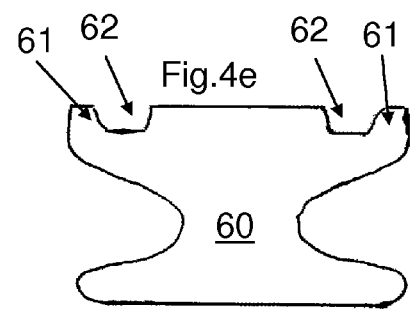

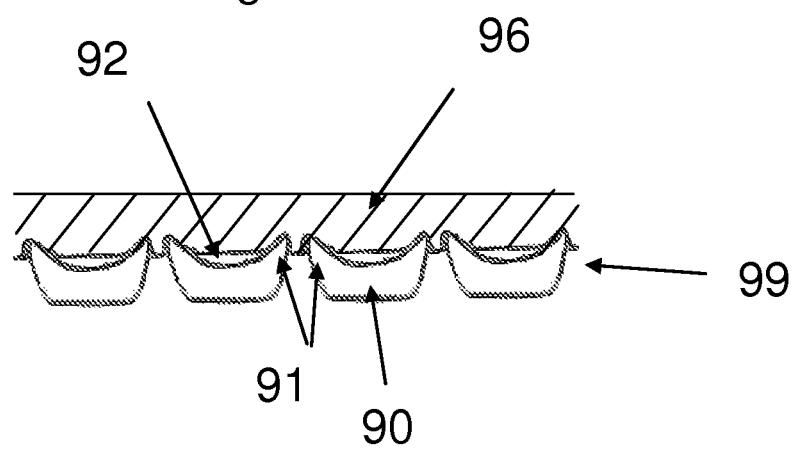

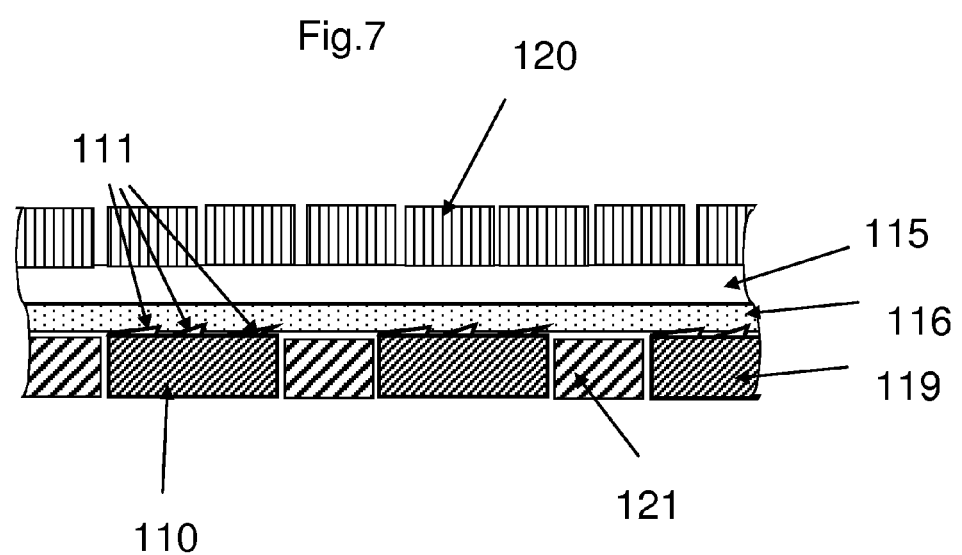

UNBONDED FLEXIBLE PIPE

TECHNICAL FIELD

The invention relates to an unbonded flexible pipe in particular for transportation of hydrocarbons and or water and/or for an umbilical as well as a method for producing such pipe.

BACKGROUND ART

Flexible pipes of the present type are well known in the art in particular for offshore transportation of fluids. Such pipes usually comprise an inner liner often referred to as an inner sealing sheath or an inner sheath, which forms a barrier against the outflow of the fluid which is conveyed through the pipe, and one or more armoring layers on the outer side of the inner liner (outer armoring layer(s)). An outer sheath may be provided with the object of forming a barrier against the ingress of fluids from the pipe surroundings to the armoring layers.

Typical unbonded flexible pipes are e.g. disclosed in WO 0161232A1, U.S. Pat. No. 6,123,114 and U.S. Pat. No. 6,085,799.

The flexible pipes are often unbonded pipes. As used in this text the term "unbonded" means that at least two of the layers including the armoring layers and polymer layers are not bonded to each other. In practice the known pipe normally comprises at least two armoring layers located outside the inner sealing sheath. In the prior art unbonded pipes, the armoring layers are not bonded to each other or to other layers directly or indirectly via other layers along the pipe. The pipe layers can therefore move relative to each other, and thereby the pipe becomes bendable, usable for dynamic applications e.g. as risers, and sufficiently flexible to roll up for transportation even when the layers are relatively thick, which is necessary for high strength pipes which should be able to withstand high pressure differences over layers of the pipe e.g. pipe differences between the pressure inside the bore of the pipe and the pressure on the outer side of the pipe.

In order to have sufficient strength, in particular to prevent the collapse of the inner sealing sheath, the unbonded flexible pipe often comprises an armoring layer located inside the space defined by the inner sealing sheath. Such inner armoring layer or layers are normally referred to as a carcass. Such carcass is usually of metal, such as steel, and is generally provided by helical winding of one or more elongate metal elements, which elongate element or elements are interlocked to each other and/or to itself in consecutive windings thereof. In the standard usually applied for unbonded flexible pipe API specification 17 J "Specification for unbonded flexible pipe", second edition, published by American Petroleum Institute, the carcass of an unbonded flexible pipe is defined as an interlocked metallic construction that can be used as the innermost layer of an unbonded flexible pipe to prevent collapse of the internal sealing sheath (sometimes also referred to as "inner liner" or "internal pressure sheath").

Since very high external pressure can act on the inner liner, the interlocking of the elongate elements of the carcass is of great importance. In case uncontrolled gaps between the elongate elements are formed, e.g. due to a slipping of the carcass profiles along the axis of the pipe, the internal sealing sheath is likely to be damaged with leak of the pipe as a result thereof. In order to avoid this, the elongate element(s) of carcass of prior art unbonded flexible pipe is/are mechanically locked together in axial direction when they are wound into a carcass.

A large number of shapes of elongate elements for providing interlocked carcass structures are known from prior art e.g. as described in U.S. Pat. No. 6,145,546, U.S. Pat. No. 6,283,161 and U.S. Pat. No. 6,889,718.

According to the teachings of U.S. Pat. No. 6,889,718 the carcass of the pipe consists of two profile types, a main profile dubbed "K-profile" comprising at least two recesses and a C-shaped locking element dubbed "c-clip". According to this patent the carcass is wound from K profiles. To ensure mutual anchoring of the K-profiles a c-clip is placed in the recesses of two adjacent K-profiles hereby forming a fully interlocked carcass structure.

Other profiles than K/c profiles are viable for formation of the carcass. The carcass can, among other possibilities be made from interlocking T-profiles as described in U.S. Pat. No. 6,283,161, from interlocking Z-profiles as described in U.S. Pat. No. 5,730,188 or from interlocked high inertia profiles as described in U.S. Pat. No. 6,889,717.

A different approach to locking of profiles is described in U.S. Pat. No. 6,516,833. According to the teachings of U.S. Pat. No. 6,516,833 a profile is made which comprises a projection and a recess. Upon formation of the carcass the projection is inserted and locked in the recess hereby ensuring a fully interlocked carcass structure in the axial direction.

The required locking feature(s) of the elongate elements and/or the formation of the interlocking are normally difficult or expensive to provide and may require expensive machinery.

The object of the invention is to provide a new type of carcass which is simpler and/or less costly to produce while simultaneously providing an acceptable security against damaging and formation of leaks of the internal sealing sheath.

The unbonded flexible pipe of the invention is as defined in the claims. Additional beneficial solutions which may have additional advantages are defined in the dependent claims and are described in the following. The invention also comprises a method of producing the unbonded flexible pipe.

According to the invention a new type of unbonded flexible pipes has been provided. The unbonded flexible pipe has a length and a center axis along its length. The unbonded flexible pipe comprises an internal sealing sheath around its center axis, a carcass arranged inside the internal sealing sheath and at least one armor arranged around the internal sealing sheath. The carcass comprises at least one helically wound elongate carcass reinforcement element providing a plurality of carcass reinforcement element windings along the length of the unbonded flexible pipe, wherein the carcass reinforcement element windings surrounds and/or are surrounded by a polymer structure, which polymer structure locks said carcass reinforcement element windings relative to each other.

In one embodiment the wherein the carcass reinforcement element windings are surrounded by the polymer structure, which polymer structure locks said carcass reinforcement element windings relative to each other.

In one embodiment the wherein the carcass reinforcement element windings surrounds the polymer structure, which polymer structure locks said carcass reinforcement element windings relative to each other.

In one embodiment the pipe comprises two polymer structures and the carcass reinforcement element windings surrounds a first of the polymer structure and are surrounded by a second of the polymer structure, which polymer structures locks said carcass reinforcement element windings relative to each other.

In the following the term "length of the unbonded flexible pipe" is used to mean the length along the axis of the unbonded flexible pipe. The internal sealing sheath is the innermost liquid impermeable sheath which has the purpose of essentially preventing a fluid e.g. a liquid, a gas or a combination of liquid and gas transported in the unbonded flexible pipe from flowing out of the unbonded flexible pipe. Minor amounts of gasses will usually migrate through the internal sealing sheath in dependence of the composition of the fluid transported, the temperature and the pressure difference over the internal sealing sheath. The internal sealing sheath may be a one-layered sheath or it may be a multi-layered bonded sheath comprising one or more polymer layers. In one embodiment the internal sealing sheath is a multi-layered partly non-bonded sheath comprising a plurality of polymer layers where at least two layers have an interfacial non-bonded contact area where they are in contact with each other but not bonded to each other in at least some areas where they are in contact with each other. In an embodiment comprising such interfacial non-bonded contact area the barrier properties of the at least two layers should preferably be such that the innermost polymer layer provides a higher barrier against migration of gas such as methane, hydrogen sulphides, carbon dioxides and water, than the polymer layer or layers of the internal sealing sheath outside of said innermost layer of the internal sealing sheath internal sealing sheath. The space inside the inner sealing sheath is also referred to as the bore of the pipe.

In one embodiment an additional liquid impermeable polymer layer is applied onto the internal sealing sheath but without being bonded or partly bonded thereto. In this embodiment the barrier properties of the internal sealing sheath and the liquid impermeable layer applied onto the internal sealing sheath should preferably be such that the internal sealing sheath provides a higher barrier against migration of gas such as methane, hydrogen sulphides, carbon dioxides and water, than the liquid impermeable layer applied onto the internal sealing sheath.

The terms "axial direction" or "axially" are used to mean the direction along the length of an axis of the pipe. The term "substantially axial direction" means the direction along the length of an axis of the pipe+/−10 degrees.

Generally it is desired that the unbonded flexible pipe is substantially circular in cross sectional shape, however, it should be understood that the flexible pipes could have other cross sectional shapes such as oval, elliptical or slightly angular (angular with rounded edges). The axis of the unbonded flexible pipes may in such situations be determined as the most central axis in the bore of the flexible pipe.

The term "circumferential direction" means the direction following the circumference of the unbonded flexible pipe and essentially perpendicular to the axis of the unbonded flexible pipe. The term "substantial circumferential direction" means the direction following the circumference of the flexible pipe in a plane perpendicular to the axis+/−10 degrees.

The terms "outside" and "inside" a member and/or a layer are used to mean outside, respectively inside said member and/or a layer in radial direction from, and perpendicular to the axis of the pipe and radially out to an outermost surface of the pipe. The terms "outermost" and "innermost" are also to be understood as in relation to the axis of the pipe.

The terms "tensile armor" and "pressure armor" and "balanced armor" are well recognized terms within the art of flexible pipes. A "tensile armor" means an armor arranged around the pipe to mainly absorb tensile forces, i.e. forces acting in axial direction. A "pressure armor" means an armor arranged around the pipe to mainly absorb pressure forces i.e. forces acting in radial direction. A "balanced armor" is an armor which is arranged to absorb both tensile forces and pressure forces.

The term "unbonded" is as defined in the introductory part of the description. Preferably at least two outer armoring layers are non-bonded with respect to each other.

The term "bonded" is used herein to mean fixed to each other over substantially the whole area where the bonded layers are in contact with each other. The terms "partly bonded" and "partly unbonded" are used interchangeably and are used herein to mean fixed to each other over a part of the area where the bonded layers are in contact with each other. A multi-layered sheath which is partly bonded may accordingly comprise a plurality of polymer layers where at least two layers comprise an interfacial non-bonded contact area where they are in contact with each other but not bonded to each other.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The unbonded flexible pipe of the invention has shown to have several highly beneficial properties. Although the skilled person prior to this invention would believe that mutual interlocking of windings of a carcass would be essential for strength purpose, the inventor of the present invention has found that such mutual interlocking of windings of a carcass is not necessary, provided that the windings of a carcass are locked by other means as defined herein. Accordingly the unbonded flexible pipe of the invention comprises a carcass with at least one helically wound elongate carcass reinforcement element providing a plurality of carcass reinforcement element windings along the length of the unbonded flexible pipe wherein the carcass reinforcement element windings are locked relative to each other by a polymer structure.

Since mutual interlocking of windings of the carcass can be omitted, the carcass will be much simpler to produce, and accordingly it will also be less costly to produce the whole unbonded flexible pipe.

Furthermore the invention opens up for providing the carcass of elongate carcass reinforcement element(s) with cross-sectional profiles, which has not been possible heretofore. The elongate carcass reinforcement element used for producing the carcass may accordingly in one embodiment have a much simpler shape than prior used elongate carcass reinforcement elements.

Additionally the unbonded flexible pipe of the invention may in one embodiment comprise a carcass which differs in shape, thickness, weight, strength and/or other properties along its length. Due to the unique structure of the flexible pipe of the invention the carcass with varying properties along the length of the unbonded flexible pipe can be produced in a very simple and cost effective manner.

The unbonded flexible pipe of the invention should preferably be at least about 50 meters, such as at least about 500 meters, such as at least about 1000 meters, such as at least about 2000 meters or more. The flexible pipe may in practice be even longer, since it can be produced with an optimized strength/weight profile such that it may be applied at depths which have not been possible with prior art pipes. A main reason for this is that the deeper a flexible pipe is to be used, the higher the requirement will be to strength against collapsing due to external hydrostatic pressure. The higher the strength that needs to be provided, the higher the weight of the pipe will be. The higher weight the more difficult transportation and installation, and in practice installation of a too heavy flexible pipe is impossible since the flexible pipe will be torn apart before the flexible pipe has been finally installed. In particular in situations where the flexible pipe is a riser pipe for transporting fluids in vertical direction e.g. from seabed to a sea surface installation such as a ship or a platform, the pull provided in the uppermost part of the pipe due to the heavy weight of the vertically extending pipe will tear and damage the pipe of prior art constructions. By optimizing the strength and weight of the carcass along the length of the unbonded flexible pipe an unbonded flexible pipe of the invention with a sufficient strength and a weight which is kept as low as possible can be provided in a relatively simple manner.

The terms "lock" and "locked" are used herein to mean locked against relative movement between the layer(s) and/or element(s) locked to each other in at least one direction. In other words, the term "the polymer structure locks said carcass reinforcement element windings to each" means that neighboring carcass reinforcement element windings or even in one embodiment all carcass reinforcement element windings are substantially locked against relative movement with respect to each other. Preferably neighboring carcass reinforcement element windings or even in one embodiment all carcass reinforcement element windings are substantially locked against relative movement in substantially axial direction with respect to each other.

The term "substantially locked" are used to mean that the relative movement between the carcass reinforcement element windings in question is limited by the polymer structure such that no essential displacement in the at least one direction—preferably in substantially axial direction—between the polymer structure and the respective carcass reinforcement element windings will occur during normal use of the unbonded flexible pipe. In other words, deformations of the polymer structure which do not result in functional damage thereof, and preferably are elastic deformations, may result in a limited relative movement while still being considered to be substantially locked in the direction in question.

In one embodiment the plurality of carcass reinforcement element windings are not directly interlocked. The term "directly interlocked" means in this connection mechanically engaged in each other without intermediate engagement element. In one embodiment the plurality of carcass reinforcement element windings are not directly interlocked or interlocked by other elements except for the locking provided by the polymer structure. In one embodiment the plurality of carcass reinforcement element windings are locked to each other mainly by said polymer structure, such that without said polymer structure locking the carcass reinforcement element windings, the carcass reinforcement element windings would not be locked in ordinary use of the unbonded flexible pipe.

The plurality of carcass reinforcement element windings may or may not overlap or only some of the carcass reinforcement element windings or parts thereof overlap. In one embodiment the plurality of carcass reinforcement element windings do not overlap. In one embodiment the plurality of carcass reinforcement element windings are partly overlapping neighboring windings but without any mutual direct interlocking.

In one embodiment the plurality of carcass reinforcement element windings are partly overlapping neighboring windings but without any mutual direct interlocking.

The polymer structure may be a single layer or a multi-layer polymer structure. A a multi-layer polymer structure generally means a polymer structure comprising several layers at least in a section thereof, where these layers are connected to each other e.g. by being bonded, partly bonded or mechanically locked to each other. The optimal composition of the polymer structure depends on several things including the shape of the carcass reinforcement element(s), the design pressure (the maximal pressure in the bore in use to which the unbonded flexible pipe is designed) and designed use (should it be used as riser, flow line or other and at which depth) of the unbonded flexible pipe. The optimal composition of the polymer structure also depends on whether the polymer structure is liquid permeable or liquid impermeable or if the polymer structure should also constitute the internal sealing sheath or not. The skilled person will be able to select a useful polymer structure based on the teaching provided herein.

In one embodiment the polymer structure comprises a single-layer structure or a multi-layer polymer structure, wherein the polymer structure is substantially uniform along the length of the pipe. In this embodiment the unbonded flexible pipe may be a riser, a flow line or a combination. The unbonded flexible pipe may also be an umbilical or a jumper using this construction of the unbonded flexible pipe.

In one embodiment the polymer structure comprises a single-layer structure and/or a multi-layer polymer structure, wherein the polymer structure varies along at least a part of the length of the pipe. This structure is particularly useful when the unbonded flexible pipe is a riser, because the strength requirement of a riser typically varies along the length of the riser. The polymer structure may for example vary along the length of the pipe with respect to one or more of thickness of the polymer structure, number of layers of the polymer structure, composition of polymer structure, permeability of the polymer structure, hardness of the polymer, tensile modulus (young's modulus) and tensile strength. The variation along the length of the pipe may be stepwise or gradual, and may be in the whole length of the pipe or merely in a part of the length of the pipe.

A variation along the length of the pipe of the polymer structure includes any variation which is provided at the manufacturing of the pipe, which variation goes beyond what is normally within ordinary manufacturing variations and tolerances and in which at least two sections of the pipe differ from each other.

In one embodiment the number of layers of the polymer structure varies along the length of the pipe such that the number of layers of the polymer structure is higher in a first section of the pipe e.g. a first end of the pipe than in a second section of the pipe e.g. a second end of the unbonded flexible pipe. In this embodiment the unbonded flexible pipe may for example be a riser where the first end is adapted to be the uppermost end of the unbonded flexible pipe in use, i.e. the end of the riser which will be subjected to the highest mechanical loads due to waves, vessel movement, and other surface phenomena. Another highly stressed point of a riser is the touch down point where the riser meets the ocean floor. Also in this zone additional reinforcement of the pipe will be highly beneficial.

In one embodiment the structure of the polymer structure varies along at least a part of the length of the pipe, e.g. by having a gradually or step wise increasing or decreasing degree of perforation in the polymer structure along the length of the unbonded flexible pipe, by having a gradually or step wise increasing or decreasing thickness of the polymer structure along the length of the unbonded flexible pipe, or by having a polymer structure of wound elongate elements where the wound element's thickness, width or shape varies gradually or stepwise along the length of the unbonded flexible pipe. These variations can be useful both in flow lines, in risers and in other unbonded flexible pipes and may be employed in situations where the heat stability requirements and/or the strength requirements are higher in a length section of the unbonded flexible pipe relative to another length section of the unbonded flexible pipe.

In one embodiment the composition of the polymer structure varies along at least a part of the length of the pipe, e.g. by having one or more layers which differ in polymer composition along its/their length, e.g. by having a gradually or step wise increasing or decreasing amount of fiber reinforcements in the polymer structure along the length of the unbonded flexible pipe, by gradually or step wise increasing or decreasing the density of the polymer of the polymer structure along the length of the unbonded flexible pipe and/or by gradually or step wise increasing or decreasing a degree of cross-linking along the length of the unbonded flexible pipe. These variations can be useful both in flow lines, in risers and in other unbonded flexible pipes and may be employed in situations where the heat stability requirements are higher in a length section of the unbonded flexible pipe relative to another length section of the unbonded flexible pipe.

In one embodiment the permeability of the polymer structure varies along at least a part of the length of the pipe, e.g. by having layers of different or varying thickness, cross-linking degree, perforations, structure and/or other ways of varying the permeability along the length of the unbonded flexible pipe, e.g. gradually or step wise increasing or decreasing. These variations can be useful both in flow lines, in risers and in other unbonded flexible pipes and may be employed in situations where the gas pressure in the bore differs along the length of the pipe.

In one embodiment the hardness of the polymer structure varies along at least a part of the length of the pipe, e.g. by having one or more layers comprising different or varying polymer composition(s) along its/their length as described above.

In one embodiment the tensile strength of the polymer structure varies along at least a part of the length of the pipe, e.g. by having one or more layers comprising different or varying polymer composition(s) along its/their length as described above.

In one embodiment the tensile modulus of the polymer structure varies along at least a part of the length of the pipe, e.g. by having one or more layers comprising different or varying polymer composition(s) along its/their length as described above.

In one embodiment the polymer structure comprises a multi-layer bonded polymer structure comprising at least 2 layers, such as at least 3 layers, wherein the layers of the multi-layer polymer structure are bonded, partly bonded and/or mechanically locked to each other. The layers may for example be bonded by applying heat and optionally pressure or by any other methods which are generally known to a skilled person.

In one embodiment the multi-layer polymer structure comprises 2 or more different layers e.g. layers that are different from each other with respect to one or more of polymer compositions, hardness, strength, tensile modulus (young's modulus), tensile strength, thickness, cross-linking degree, perforations, permeability and structure of the respective layers.

In one embodiment the multi-layer polymer structure comprises a first polymer structure layer closer to the helically wound elongate carcass reinforcement element than a second polymer structure layer, and the first polymer structure layer has a higher tensile strength than the second polymer structure layer determined at 25° C.

In one embodiment the multi-layer polymer structure comprises a first polymer structure layer closer to the helically wound elongate carcass reinforcement element than a second polymer structure layer, and the first polymer structure layer has a higher hardness than the second polymer structure layer determined at 25° C.

In one embodiment the multi-layer polymer structure comprises a first polymer structure layer closer to the helically wound elongate carcass reinforcement element than a second polymer structure layer, and the first polymer structure layer has a higher strength than the second polymer structure layer determined at 25° C.

In one embodiment the multi-layer polymer structure comprises a first polymer structure layer closer to the helically wound elongate carcass reinforcement element than a second polymer structure layer, and the first polymer structure layer is thinner, e.g. about 50% thinner or more than the second polymer structure layer determined at 25° C.

In an embodiment where the unbonded flexible pipe of the invention with a polymer structure comprising a first polymer structure layer closer to the helically wound elongate carcass reinforcement element than a second polymer structure layer, and where the first polymer structure layer has a higher hardness, is stronger, is more cross-linked and/or has a higher tensile strength than the second polymer structure layer (all determined at 25° C.), the first polymer structure layer may be relatively stiff compared to the second polymer structure layer. However, since the second polymer structure layer will support the first polymer structure layer, the first polymer structure layer can be selected to be sufficiently thin to not decrease the flexibility of the unbonded flexible pipe to an undesired degree. Furthermore it has been found that a polymer structure comprising such a combination of a first polymer structure layer with a relatively high stiffness and a second polymer structure layer with a relatively low stiffness has a more durable strength.

In one embodiment the polymer structure comprises at least one film layer, cloth layer and/or web layer, such as a polymer film layer with a thickness of from about 25 µm to about 1 mm. The film layer may for example be selected to have a relatively high barrier against migration of gas such as methane, hydrogen sulphides, carbon dioxides and water, relative to another layer of the polymer layer or layers of the polymer structure. The film layer may preferably be the innermost liquid impervious layer of the polymer structure. In one embodiment the film layer is perforated and accordingly liquid pervious.

The polymer structure may in principle have any thickness provided that it is sufficiently strong to lock the carcass reinforcement element windings to each other. Preferably the polymer structure is sufficiently strong to lock the carcass reinforcement element windings to each other during the pipe manufacturing process.

In one embodiment the polymer structure has a total thickness of at least about 2 mm, such as at least about 4 mm, the polymer structure preferably having a total thickness of at least about ¼ of the total thickness of the carcass, such as at least about ⅓ of the total thickness of the carcass, such as at least about ½ of the total thickness of the carcass, such as at least about ⅔ of the total thickness of the carcass, such as at least about ¾ of the total thickness of the carcass.

The thickness of the polymer structure may also be selected to provide a good thermal insulation to the unbonded flexible pipe; however, a too high thickness may make the unbonded flexible pipe unduly stiff and/or heavy.

Examples of materials of the polymer structure comprise one or more of the materials selected from polyolefins, e.g.

polyethylene, cross-linked polyethylene (PEX) or poly propylene; polyamide, e.g. poly amide-imide, polyamide-11 (PA-11), polyamide-12 (PA-12) or polyamide-6 (PA-6)); polyimide (PI); polyurethanes; polyureas; polyesters; polyacetals; polyethers, e.g. polyether sulphone (PES); polyoxides; polysulfides, e.g. polyphenylene sulphide (PPS); polysulphones, e.g. polyarylsulphone (PAS); polyacrylates; polyethylene terephthalate (PET); polyether-ether-ketones (PEEK); polyvinyls; polyacrylonitrils; polyetherketoneketone (PEKK); copolymers of the preceding; fluorous polymers e.g. polyvinylidene difluoride (PVDF), homopolymers or copolymers of vinylidene fluoride ("VF2"), homopolymers or copolymers of trifluoroethylene ("VF3"), copolymers or terpolymers comprising two or more different members selected from VF2, VF3, chlorotrifluoroethylene, tetrafluoroethylene, hexafluoropropene, or hexafluoroethylene; compounds comprising one or more of the above mentioned polymers, and composite materials, such as a polymer (e.g. one of the above mentioned) compounded with reinforcement fibers, such as glass-fibers, carbon-fibers and/or aramide fibers.

In one embodiment the polymer structure is liquid pervious. The polymer structure may for example be a perforated structure comprising one or more perforations allowing fluid to pass.

In one embodiment the polymer structure is a multi-layered structure which comprises at least one liquid pervious layer. Preferably at least a layer of the polymer in direct contact with the carcass is liquid pervious.

In one embodiment the polymer structure is a single or a multi-layered structure and the unbonded flexible pipe comprises an additional polymer layer applied onto the polymer structure without being bonded or mechanically locked thereto. In this embodiment, the polymer structure may preferably be liquid pervious.

In one embodiment the polymer structure is an extruded structure. If the extruded layer is placed onto the plurality of carcass reinforcement element windings along the length of the unbonded flexible pipe directly after the extrusion such that the polymer is still at least partly moldable, the polymer structure provides a very good locking of the carcass reinforcement element windings to each other, in particular if the carcass reinforcement element(s) comprises one or more flanges as described further below.

In one embodiment where the polymer structure is a multi-layer structure the polymer structure comprises at least one extruded layer, for example two extruded layers or a combination of extruded and wound and/or folded layers.

In one embodiment where the polymer structure comprises at least one extruded layer, the polymer structure is liquid impervious e.g. provided by this extruded layers. In situations where the polymer structure comprises at least one liquid impervious layer and optionally one or more liquid pervious layers—e.g. perforated layers, the whole polymer structure is defined as being liquid impervious.

In one embodiment where the polymer structure comprises at least one liquid impervious layer, the polymer structure constitutes the inner sealing sheath.

By providing the polymer structure as the internal sealing sheath this polymer structure/internal sealing sheath will have a dual function i.e. it will function a internal sealing sheath and as polymer structure locking the carcass reinforcement element windings to each other. Usually such polymer structure/internal sealing sheath will be thicker than a polymer structure or an internal sealing sheath which has only one of the functions. However, even though the polymer structure/internal sealing sheath may have this higher thickness, the total thickness of the individual internal sealing sheath and polymer structure may be much larger than the thickness of the polymer structure/internal sealing sheath and accordingly large amounts of materials and corresponding weight of the pipe may be saved. Additionally it will usually be cheaper to apply one layer than two or more layers.

In one embodiment the polymer structure is a liquid pervious layer applied between the carcass and the internal sealing sheath. In this embodiment the plurality of carcass reinforcement element windings are locked to each other from the inner side of the carcass reinforcement element windings. An additional polymer structure and/or an inner sealing may be applied outside e.g. directly on the outer side of the carcass reinforcement element windings.

The one or more helically wound elongate carcass reinforcement elements may in principle be of any material which reinforces the unbonded flexible pipe and which has a higher strength than the material of the internal sealing sheath.

In one embodiment the one or more helically wound elongate carcass reinforcement elements comprise or consist essentially of metal. The metal may for example comprise one or more of the metals aluminum, titanium, and steel, e.g., stainless steel, such as duplex steel, and carbon steel.

In one embodiment the one or more helically wound elongate carcass reinforcement elements comprise or consist essentially of metal composite material comprising one or more polymers selected from thermoset polymers, cross-linked polymers and/or reinforced polymer. The reinforcement polymer may preferably be reinforced with one or more of metals, such as metal powder and/or metal fibers; glass-fibers; carbon-fibers and/or aramide fibers.

Examples of highly useful materials for the one or more helically wound elongate carcass reinforcement elements which materials may be used separately or in any combinations comprise the composite material described in U.S. Pat. No. 4,706,713, the steel material described in U.S. Pat. No. 5,213,637, the steel material described in U.S. Pat. No. 5,407,744, the steel material described in U.S. Pat. No. 5,922,149, the steel material described in U.S. Pat. No. 6,291,079, the steel material described in U.S. Pat. No. 6,408,891, the steel material described in U.S. Pat. No. 6,904,939, the steel material described in U.S. Pat. No. 7,459,033, the steel material described in WO 06097112, the composite material materials described in WO 05043020, the composite materials described in WO 02095281, the steel material described in U.S. Pat. No. 6,282,933 and the steel material described in U.S. Pat. No. 6,408,891.

The helically wound elongate carcass reinforcement element(s) may in principle have any elongate shape, e.g. in the form of a wire with an extruded profile (referred to as a profile) or a wire provided from a folded or a non-folded strip.

The helically wound elongate carcass reinforcement element(s) may have any cross-sectional profile along their length, such as the cross-sectional profiles of known helically wound armoring profiles or folded strips, such as the cross-sectional profiles and the/any combination of cross-sectional profiles of helically wound armoring profiles or folded strips described and shown in drawings in one or more of the following publications with the provision that the helically wound elongate carcass reinforcement element(s) used in the present invention is not interlocked: GB 1 404 394, U.S. Pat. No. 3,311,133, U.S. Pat. No. 3,687,169, U.S. Pat. No. 3,858, 616, U.S. Pat. No. 4,549,581, U.S. Pat. No. 4,706,713, U.S. Pat. No. 5,213,637, U.S. Pat. No. 5,407,744, U.S. Pat. No. 5,601,893, U.S. Pat. No. 5,645,109, U.S. Pat. No. 5,669,420, U.S. Pat. No. 5,730,188, U.S. Pat. No. 5,730,188, U.S. Pat. No. 5,813,439, U.S. Pat. No. 5,837,083, U.S. Pat. No. 5,922, 149, U.S. Pat. No. 6,016,847, U.S. Pat. No. 6,065,501, U.S. Pat. No. 6,145,546, U.S. Pat. No. 6,192,941, U.S. Pat. No. 6,253,793, U.S. Pat. No. 6,283,161, U.S. Pat. No. 6,291,079, U.S. Pat. No. 6,354,333, U.S. Pat. No. 6,382,681, U.S. Pat. No. 6,390,141, U.S. Pat. No. 6,408,891, U.S. Pat. No. 6,415,825, U.S. Pat. No. 6,454,897, U.S. Pat. No. 6,516,833, U.S. Pat. No. 6,668,867, U.S. Pat. No. 6,691,743, U.S. Pat. No. 6,739,355 U.S. Pat. No. 6,840,286, U.S. Pat. No. 6,889,717, U.S. Pat. No. 6,889,718, U.S. Pat. No. 6,904,939, U.S. Pat. No. 6,978,806, U.S. Pat. No. 6,981,526, U.S. Pat. No. 7,032,623, U.S. Pat. No. 7,311,123, U.S. Pat. No. 7,487,803, US 23102044, WO 28025893, WO 2009024156, WO 2008077410 and WO 2008077409.

The helically wound elongate carcass reinforcement element(s) may have any cross-sectional profile, and may have a uniform or a varying shape along its/their length.

In one embodiment the one or more helically wound elongate carcass reinforcement elements have cross-sectional profiles along their respective length selected from a round (circular, oval) profile, an angular (quadrilateral, rectangular, square, rhomboid, trapezoid) profile, C-shaped profile, a U-shaped profile, a T-shaped profile, an I-shaped profile, a K-shaped profile, a Z-shaped profile, an X-shaped profile, a ψ (psi)-shaped profile and any combinations there combinations thereof.

In one embodiment the one or more helically wound elongate carcass reinforcement elements have cross-sectional profiles along their respective length comprising one or more folds, preferably selected from an S-shaped folded profile, a C-shaped folded profile, a Q-shaped folded profile, an O-shaped folded profile, and combinations thereof.

The at least one helically wound elongate carcass reinforcement element should generally be wound with a relatively high winding angle in order to provide a desirable high resistance against crushing of the pipe. In one embodiment the at least one helically wound elongate carcass reinforcement element is wound with an angle to the axis of the pipe which is at least about 80 degrees, such as at least about 85 degrees, such as up to about 90 degrees. This selection of winding angle is generally known in the art.

In one embodiment the plurality of carcass reinforcement element windings are chemically and/or mechanically locked to the polymer structure. For providing a strong and durable locking of the said carcass reinforcement element windings by the polymer structure it is in one embodiment desired that the plurality of carcass reinforcement element windings are at least partly mechanically locked to the polymer structure.

In one embodiment the plurality of carcass reinforcement element windings are mechanically locked to the polymer structure in axial direction relative to the unbonded flexible pipe, such that the plurality of carcass reinforcement element windings are prevented from uncontrolled movement in the axial direction relative to the polymer structure. The allowed relative movement in axial direction of the plurality of carcass reinforcement element windings depends largely on the use of the pipe and the strength of the armor arranged around the internal sealing sheath. When the pipe is a riser, the allowed relative movement in axial direction of the plurality of carcass reinforcement element windings will normally be smaller than in the case where the pipe is a flow line.

The polymer structure may for example lock the carcass reinforcement element windings to each other by engagement with protruding part(s) of the at least one helically wound elongate carcass reinforcement element, where the protruding part(s) of the at least one helically wound elongate carcass reinforcement element protrudes towards the polymer structure. The protruding part(s) may for example comprise one or more flanges and/or a plurality of teeth arranged on the at least one helically wound elongate carcass reinforcement element. By arranging the flanges/teeth along the length of the at least one helically wound elongate carcass reinforcement element, the locking provided can be regulated to lock the plurality of carcass reinforcement element windings in one or more directions relative to the axis of the pipe.

In one embodiment the at least one helically wound elongate carcass reinforcement element comprises one or more flanges arranged to lock the plurality of carcass reinforcement element windings mechanically to the polymer structure to reduce or prevent relative axial movement there between.

In one embodiment the at least one helically wound elongate carcass reinforcement element comprises one or more protruding flanges and/or teeth arranged to engage with the polymer structure to lock the plurality of carcass reinforcement element windings mechanically to the polymer structure to reduce or prevent relative axial movement there between.

The protruding flange of the helically wound elongate carcass reinforcement element may be arranged to have a length with a length direction substantially perpendicular to the circumferential direction of the flexible pipe.

The elongate carcass reinforcement element(s) comprising flange(s) or teeth may be produced using any method e.g. by folding, by extrusion and/or other method well known in the art.

In one embodiment a plurality of flanges may be mounted to the elongate carcass reinforcement element(s) prior to winding it. Such mounted flanges may e.g. be mounted by welding, gluing or by mechanical means. In embodiments comprising teeth, such teeth may be provided by equivalent methods as the method for providing a plurality of flanges.

The flange(s) and or teeth should preferably protrude towards the polymer structure e.g. with an angle of about 90 degrees+/−up to about 45 degrees, preferably with an angle of about 90 degrees+/−up to about 30 degrees.

In one embodiment the flange(s) and or teeth preferably protrude to a sufficient degree and are sufficiently sharp to make a desirable resistance against relative movement between the plurality of carcass reinforcement element windings and the polymer structure in at least one direction. The flange(s) and or teeth should preferably protrude partly into the polymer structure such that the polymer structure will be slightly deformed without resulting in cracks or cuts in the polymer structure.

In one embodiment the unbonded flexible pipe comprises a support layer for supporting the helically wound elongate carcass reinforcement element(s) in particular prior to the polymer structure is applied. Such support layer may have the function of simplifying the handling of the helically wound elongate carcass reinforcement element prior to the polymer structure has been applied and the plurality of carcass reinforcement element windings have been locked to each other by the polymer structure.

The support layer may for example be a textile layer or a mesh layer.

In one embodiment the support layer is an outer support layer arranged between the at least one helically wound elongate carcass reinforcement element and the polymer structure, preferably the outer support layer is in direct contact with the carcass.

In one embodiment the support layer is an inner support layer arranged inside the at least one helically wound elongate carcass reinforcement element; preferably the inner support layer is in direct contact with the carcass.

In one embodiment the support layer only has a function during the manufacturing of the unbonded flexible pipe and is removed immediately prior to application of the polymer structure or after application of the polymer structure in case of an inner support layer. In this embodiment the support layer will naturally not be present in the resulting unbonded flexible pipe.

The unbonded flexible pipe may comprise at least one helically wound elongate filler element, such as a filler element of a thermoplastic polymer.

Such filler element(s) may in one embodiment be arranged between and optionally interlock the carcass reinforcement element windings.

In one embodiment where the unbonded flexible pipe comprises at least one helically wound elongate filler element, the unbonded flexible pipe comprises a first and a second end, where the first and the second end comprises each an end fitting fixed to at least one helically wound elongate carcass reinforcement element and the internal sealing sheath, and the filler element is not directly fixed to at least one of the end fittings. Preferably the filler element is not directly fixed to any of the end fittings.

The filler element may have the function of stabilizing the one or more helically wound elongate carcass reinforcement elements.

The at least one armor arranged around the internal sealing sheath may be as described in any one of the above referred prior art documents, and may preferably comprise at least one tensile armoring layer. In one embodiment the at least one armor arranged around the internal sealing sheath comprises at least one layer of one or more helically wound elongate reinforcement elements, the at least one armor preferably comprises at least two layers of helically wound elongate reinforcement elements.

In one embodiment the flexible pipe is an unbonded pipe, the flexible pipe preferably comprises two or more outer armoring layers, preferably comprising at least one pressure armoring layer and at least one tensile armoring layer, preferably anti-wear layer or layers are applied between the outer armoring layers.

The flexible pipe of the invention may accordingly be combined with any additional layers selected from the layers of flexible pipes described in any one of the prior art documents GB 1 404 394, U.S. Pat. No. 3,311,133, U.S. Pat. No. 3,687,169, U.S. Pat. No. 3,858,616, U.S. Pat. No. 4,549,581, U.S. Pat. No. 4,706,713, U.S. Pat. No. 5,213,637, U.S. Pat. No. 5,407,744, U.S. Pat. No. 5,601,893, U.S. Pat. No. 5,645,109, U.S. Pat. No. 5,669,420, U.S. Pat. No. 5,730,188, U.S. Pat. No. 5,730,188, U.S. Pat. No. 5,813,439, U.S. Pat. No. 5,837,083, U.S. Pat. No. 5,922,149, U.S. Pat. No. 6,016,847, U.S. Pat. No. 6,065,501, U.S. Pat. No. 6,145,546, U.S. Pat. No. 6,192,941, U.S. Pat. No. 6,253,793, U.S. Pat. No. 6,283,161, U.S. Pat. No. 6,291,079, U.S. Pat. No. 6,354,333, U.S. Pat. No. 6,382,681, U.S. Pat. No. 6,390,141, U.S. Pat. No. 6,408,891, U.S. Pat. No. 6,415,825, U.S. Pat. No. 6,454,897, U.S. Pat. No. 6,516,833, U.S. Pat. No. 6,668,867, U.S. Pat. No. 6,691,743, U.S. Pat. No. 6,739,355 U.S. Pat. No. 6,840,286, U.S. Pat. No. 6,889,717, U.S. Pat. No. 6,889,718, U.S. Pat. No. 6,904,939, U.S. Pat. No. 6,978,806, U.S. Pat. No. 6,981,526, U.S. Pat. No. 7,032,623, U.S. Pat. No. 7,311,123, U.S. Pat. No. 7,487,803, US 23102044, WO 28025893, WO 2009024156, WO 2008077410 and WO 2008077409.

In one embodiment the unbonded flexible pipe further comprises an outer sheath for mechanical and/or chemical protection, the outer sheath being the outermost polymer sheath, and the outer sheath is permeable or impermeable to liquid.

In one embodiment the at least one armor arranged around the internal sealing sheath comprises at least one outer armoring layer arranged between the internal sealing sheath and the outer sheath.

In one embodiment the at least one armor arranged around the internal sealing sheath comprises at least one external armoring layer arranged around the outer sheath.

In one embodiment the unbonded flexible pipe further comprises one or more additional layers such as one or more of the layers an intermediate polymer layer, an anti-wear layer, a thermal insulating layer an outer sheath for mechanical and/or chemical protection and a barrier layer for reducing or substantially avoiding migration of gasses.

In one embodiment the unbonded flexible pipe further comprises one or more sensors e.g. comprising an optical fiber.

In one embodiment the unbonded flexible pipe is a riser.

In one embodiment the unbonded flexible pipe is a flow line.

The invention also relates to a method of producing the unbonded flexible pipe of the invention.

The method of the invention comprises
providing at least one elongate carcass reinforcement element and winding the at least one elongate carcass reinforcement element to provide a plurality of carcass reinforcement element windings around the center axis;
surrounding the carcass reinforcement element windings with a polymer structure such that the polymer structure locks the carcass reinforcement element windings relative to each other;
if the polymer structure is liquid impermeable, the polymer structure constitutes an internal sealing sheath; if the polymer structure is liquid permeable, the method comprises applying an internal sealing sheath around the polymer structure; and
further applying at least one armor arranged around the internal sealing sheath.

The at least one elongate carcass reinforcement element may beneficially be wound around a support element, such as a mandrel and/or an inner support layer which may or may not be removable.

The surrounding of the carcass reinforcement element windings with a polymer structure may for example comprise winding a polymer around the carcass optionally in direct contact with the carcass or onto another part of the polymer structure.

The surrounding of the carcass reinforcement element windings with a polymer structure may for example comprise winding a polymer in the form of an elongate element preferably selected from a film, a strip a profiled element or a combination thereof.

In one embodiment the surrounding of the carcass reinforcement element windings with a polymer structure comprises folding a polymer around the carcass optionally in direct contact with the carcass or onto another part of the polymer structure.

In one embodiment the surrounding of the carcass reinforcement element windings with a polymer structure comprises extruding a polymer around the carcass optionally in direct contact with the carcass or onto another part of the polymer structure.

The polymer structure may for example be heat treated during or after application onto the carcass, optionally by heating the carcass, by heating the polymer e.g. using infrared radiation or both. The heat treatment should preferably be sufficient in time and temperature to molten at least a part of the polymer material but without directly melting the polymer material of the polymer structure.

In one embodiment the method comprises applying an outer support layer prior to application of the polymer structure. The outer support layer may preferably be applied onto the helically wound elongate carcass reinforcement element(s) in an in-line process with winding of the carcass reinforcement element(s).

Other desired steps of the method of the invention are described above.

BRIEF DESCRIPTION OF DRAWINGS

The invention will be explained more fully below in connection with a preferred embodiment and with reference to the drawings in which:

FIG. 2b is a schematic side view of a variation of the unbonded flexible pipe shown in FIG. 2a.

FIG. 2c is a schematic side view of another variation of the unbonded flexible pipe shown in FIG. 2a.

FIGS. 4a-4f are cross-sectional views of different elongate carcass reinforcement elements which can be used in the unbonded flexible pipe of the invention.

FIG. 5 illustrates a section of a carcass and a polymer structure seen in a sectional view of an unbonded flexible pipe of the invention.

FIG. 7 illustrates a section of yet another carcass and polymer structure as well as an internal sealing sheath and an insulating layer seen in a sectional view of an unbonded flexible pipe of the invention.

The figures are schematic and may be simplified for clarity. Throughout the same reference numerals are used for identical or corresponding parts.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
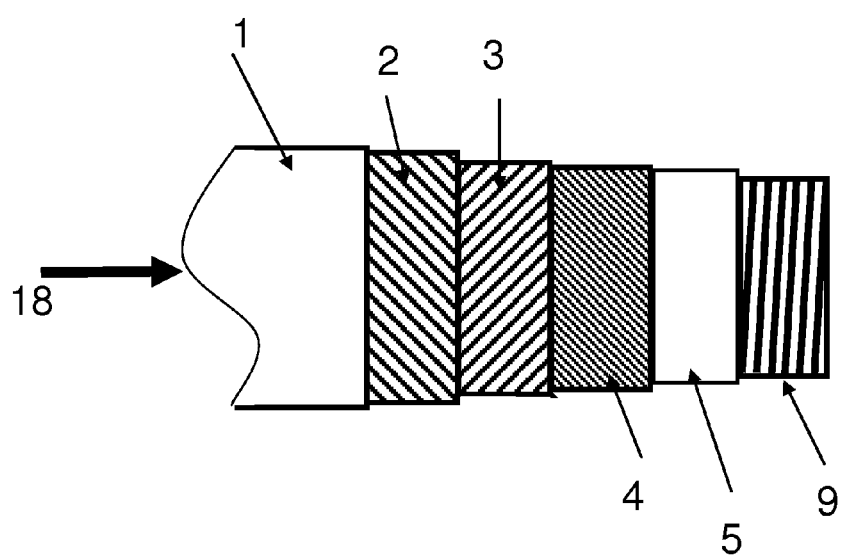
FIG. 1 is a schematic side view of an unbonded flexible pipe of the invention comprising a carcass comprising at least one elongate carcass reinforcement element helically wound to provide a plurality of carcass reinforcement element windings along the length of the pipe, where the carcass is arranged inside a polymer sheath providing both an internal sealing sheath and a polymer structure.

The unbonded flexible pipe of the invention shown in FIG. 1 comprises a carcass 9 comprising at least one elongate carcass reinforcement element helically wound to provide a plurality of carcass reinforcement element windings along the length of the pipe. As described above the carcass reinforcement element(s) is preferably wound with an angle to the axis of the pipe which is from about 75 degrees to as near 90 degrees as possibly. Usually the carcass reinforcement element(s) is preferably wound with an angle to the axis of the pipe which is from about 80 degrees to about 85 degrees. Around the carcass 9 an internal sealing sheath/polymer structure 5 is applied. The internal sealing sheath/polymer structure 5 has both the function of providing a sealing against outflow of the fluid to be transported in the pipe and to provide a locking of the carcass reinforcement element windings to each other. The internal sealing sheath/polymer structure 5 may be a single layer structure or a multi-layer structure e.g. as described above. In one embodiment the internal sealing sheath/polymer structure 5 comprises cross linked polyethylene (PEX), polyamide (PA-11, PA 12) PVDF and/or other fluor containing polymers.

On the outer side of the internal sealing sheath/polymer structure 5, the unbonded flexible pipe comprises a pressure armor 4 e.g. of one or more helically wound interlocked or non-interlocked elongate reinforcing elements, where the helically wound element(s) is wound with an angle to the axis of the pipe which is from about 75 degrees to as close to 90 degrees as possible, such as with an angle to the axis of the pipe which is from about 80 degrees to about 85 degrees. The pressure armor 4 may comprise one or more layers.

On the outer side of the pressure armor 4, the unbonded flexible pipe comprises a pair of cross wound armoring layers 2, 3. The cross wound armoring layers 2, 3 may for example be tensile armoring layers and made from wound profiles and/or strips, wherein the tensile armoring layers have angle to the axis of about 55 degrees or less. In an alternative embodiment at least one of the layers 2, 3 is a tensile armoring layer, for example one of the armoring layers 2 has an angle above 55 degrees, typically between 60 and 75 degrees, and the other one of the armoring layers 3 has an angle below 55 degrees, typically between 30 and 45 degrees.

Between respectively the two cross wound armoring layers 2, 3 and the innermost cross wound armoring layer 3 and the pressure armor 4 is arranged a not shown anti-wear layer for reducing wear when the armoring layers 2, 3, 4 move relative to each other.

An outer sheath 1 is arranged around the outermost cross wound armoring layer 2 for mechanical protection and optionally also for chemical protection of the armoring layers. The outer sheath may be liquid permeable or liquid impermeable. The arrow 8 indicates the flow of the liquid in the pipe.

The flexible pipe may have fewer or more layers than the pipe shown in FIG. 1, for example the pipe may have additional layers such as an insulation layer, additional protection layers, intermediate layers and other and the pressure armor and/or the outer sheath may e.g. be omitted.

The layers may e.g. be of materials as described above and/or of materials as usually employed in flexible pipes.

The unbonded flexible pipe of the invention shown in FIG. 2 comprises a carcass 19 comprising at least one elongate carcass reinforcement element helically wound to provide a plurality of carcass reinforcement element windings along the length of the pipe e.g. as described above.

Around the carcass 19 a liquid pervious polymer structure 16 is applied. The liquid pervious polymer structure 16 comprises perforations in the form of oblong slits 16a arranged with their length direction substantially perpendicular to the axial direction of the pipe. Other methods for making the polymer structure 16 liquid permeable will be available to the skilled person and include for example a wound polymer structure. The liquid pervious polymer structure 16 provides a locking of the carcass reinforcement element windings to each other e.g. as described herein.

Outside the liquid pervious polymer structure 16, the unbonded flexible pipe comprises an internal sealing sheath 15 for example of extruded cross linked polyethylene (PEX), polyamide (PA-11, PA 12) PVDF and/or other fluor containing polymers.

On the outer side of the internal sealing sheath 15 the unbonded flexible pipe comprises a pressure armor 14, a pair of cross wound armoring layers 13, 12, anti-wear layers 17 and an outer sheath 11 e.g. as described for FIG. 1. The unbonded flexible pipe may comprise additional layers or layers may be omitted e.g. as described for FIG. 1. The arrow 18 indicates the flow of the liquid in the pipe.

Figure 2A:
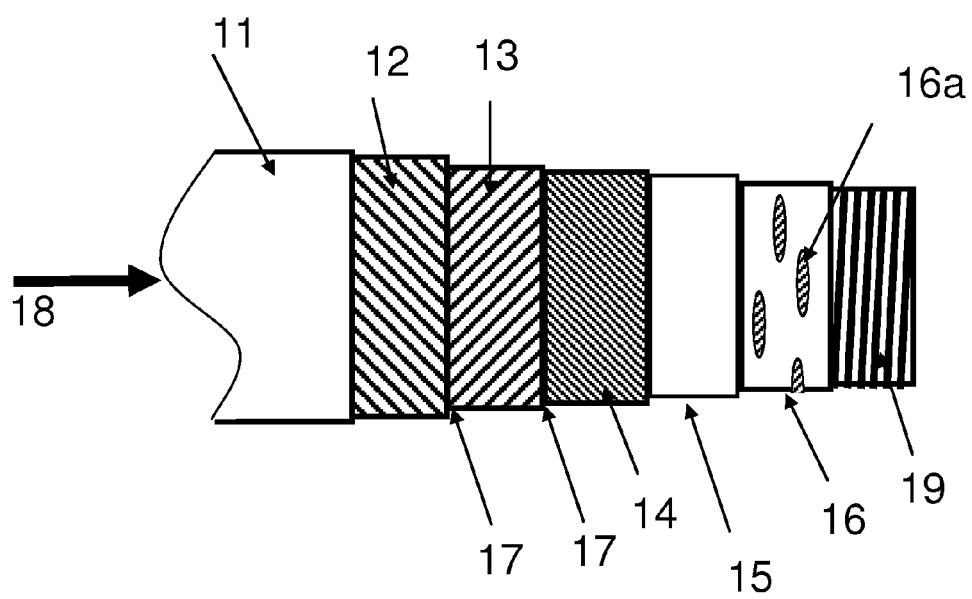
FIG. 2a is a schematic side view of unbonded flexible pipe of the invention comprising a carcass comprising at least one elongate carcass reinforcement element helically wound to provide a plurality of carcass reinforcement element windings along the length of the pipe, where the pipe is surrounded by a polymer structure and an internal sealing sheath.

The pipe shown in FIG. 2b differs from the pipe shown in FIG. 2a in that it additionally comprises a further polymer structure 16b arranged on the inner side of the carcass 19. The polymer structure 16b is liquid pervious and comprises perforations in the form of oblong slits 16a arranged with their length direction substantially perpendicular to the axial direction of the pipe. The liquid pervious polymer structure 16b provides an additional locking of the carcass reinforcement element windings to each other.

Figure 2C:
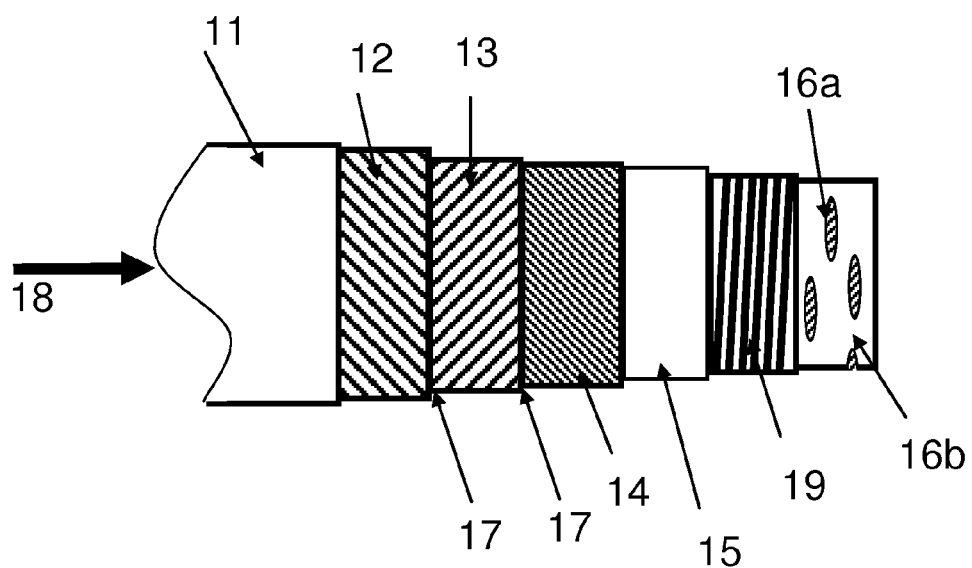

The pipe shown in FIG. 2c differs from the pipes shown in FIGS. 2a and 2b in that it does not comprise a liquid pervious polymer structure around the carcass 19, but merely it comprises the polymer structure 16b arranged on the inner side of the carcass 19. The polymer structure 16b provides the locking of the carcass reinforcement element windings to each other.

Figure 3:
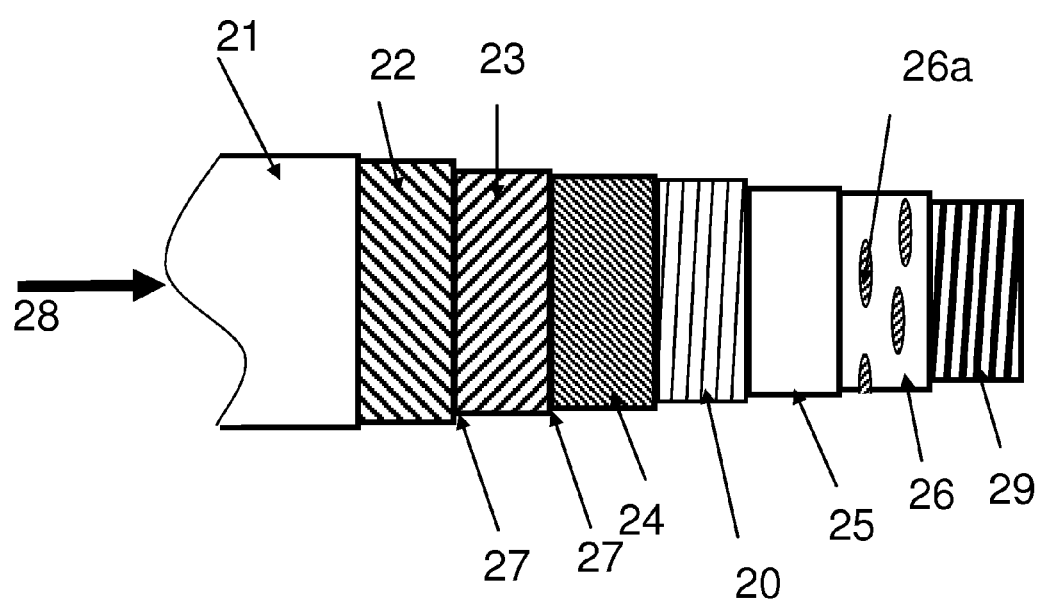
FIG. 3 is a schematic side view of an unbonded flexible pipe of the invention further comprising an insulating layer.

The unbonded flexible pipe of the invention shown in FIG. 3 comprises a carcass 29 comprising at least one elongate carcass reinforcement element helically wound to provide a plurality of carcass reinforcement element windings along the length of the pipe e.g. as described above.

Around the carcass 29 a liquid pervious polymer structure 26 is applied. The liquid pervious polymer structure 26 may for example be as described above and is here shown oblong slits 26a. Outside the liquid pervious polymer structure 26, the unbonded flexible pipe comprises an internal sealing sheath 25 for example as described above.

On the outer side of the internal sealing sheath 25 the unbonded flexible pipe comprises insulating layer 20 which e.g. may be wound, extruded or folded.

On the outer side of the insulating layer 20 the unbonded flexible pipe comprises a pressure armor 24, a pair of cross wound armoring layers 23, 22, anti-wear layers 27 and an outer sheath 21 e.g. as described for FIG. 1. The unbonded flexible pipe may comprise additional layers or layers may be omitted e.g. as described for FIG. 1. The arrow 28 indicates the flow of the liquid in the pipe.

Figure 4A:
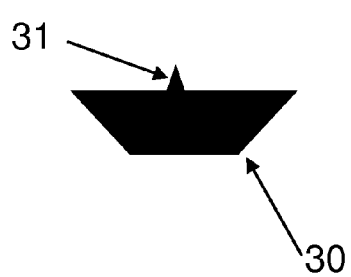

FIG. 4a show the profile shape of a first example of an elongate carcass reinforcement element which can be used in the unbonded flexible pipe of the invention. The elongate carcass reinforcement element of FIG. 4a has a trapezoid cross-sectional shape 30 (also called its profile), with a flange 31 arranged to face and engage with the polymer structure such that the polymer structure can lock carcass reinforcement element windings to each other when the elongate carcass reinforcement element has been helically wound to form the carcass.

Figure 4B:
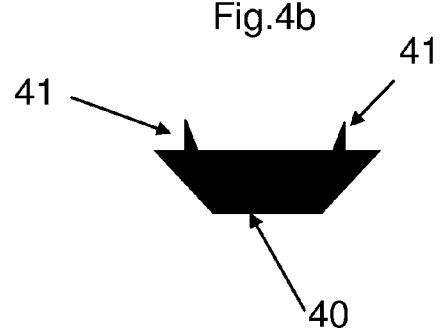

FIG. 4b shows the profile shape of a second example of an elongate carcass reinforcement element which can be used in the unbonded flexible pipe of the invention. The elongate carcass reinforcement element of FIG. 4b has a trapezoid cross-sectional shape 40 (also called its profile), with flanges or teeth 41 arranged to face and engage with the polymer structure such that the polymer structure can lock carcass reinforcement element windings to each other when the elongate carcass reinforcement element has been helically wound to form the carcass.

Figure 4C:
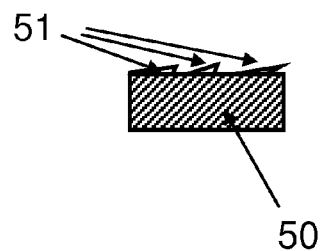

FIG. 4c shows the profile shape of a third example of an elongate carcass reinforcement element which can be used in the unbonded flexible pipe of the invention. The elongate carcass reinforcement element of FIG. 4c has a rectangular cross-sectional shape 50 (also called its profile), with teeth 51 arranged to face and engage with the polymer structure such that the polymer structure can lock carcass reinforcement element windings to each other when the elongate carcass reinforcement element has been helically wound to form the carcass.

FIG. 4d shows the profile shape of a fourth example of an elongate carcass reinforcement element which can be used in the unbonded flexible pipe of the invention. The elongate carcass reinforcement element of FIG. 4d has an I-shaped cross-sectional shape 60 (also called its profile), with flanges 61 and channels 62. The flanges 61 are arranged to face and engage with the polymer structure such that the polymer structure deforms to at least partly fill the channels 62 and thereby can lock carcass reinforcement element windings to each other when the elongate carcass reinforcement element has been helically wound to form the carcass.

FIG. 4e shows the profile shape of a fifth example of an elongate carcass reinforcement element which can be used in the unbonded flexible pipe of the invention. The elongate carcass reinforcement element of FIG. 4e has a C-shaped cross-sectional shape 70 (also called its profile), with flanges 71 and channel 72. The flanges 71 are arranged to face and engage with the polymer structure such that the polymer structure deforms to at least partly fill the channel 72 and thereby can lock carcass reinforcement element windings to each other when the elongate carcass reinforcement element has been helically wound to form the carcass.

FIG. 4f shows the profile shape of a sixth example of an elongate carcass reinforcement element which can be used in the unbonded flexible pipe of the invention. The elongate carcass reinforcement element of FIG. 4f is made from a strip which is folded to a butterfly-shaped cross-sectional shape 80 (also called its profile), with flanges 81 and channel 82. The flanges 81 are arranged to face and engage with the polymer structure such that the polymer structure deforms to at least partly fill the channel 82 and thereby can lock carcass reinforcement element windings to each other when the elongate carcass reinforcement element has been helically wound to form the carcass.

FIG. 5 shows a carcass 99 and a polymer structure 96 seen in a sectional view of an unbonded flexible pipe of the invention. The carcass 99 is made from a helically wound elongate carcass reinforcement element with a C-shaped cross-sectional shape 90, with flanges 91 and channel 92. The flanges 91 are arranged to face and engage with the polymer structure such that the polymer structure deforms to at least partly fill the channel 92 and thereby locks carcass reinforcement element windings to each other.

Figure 6:
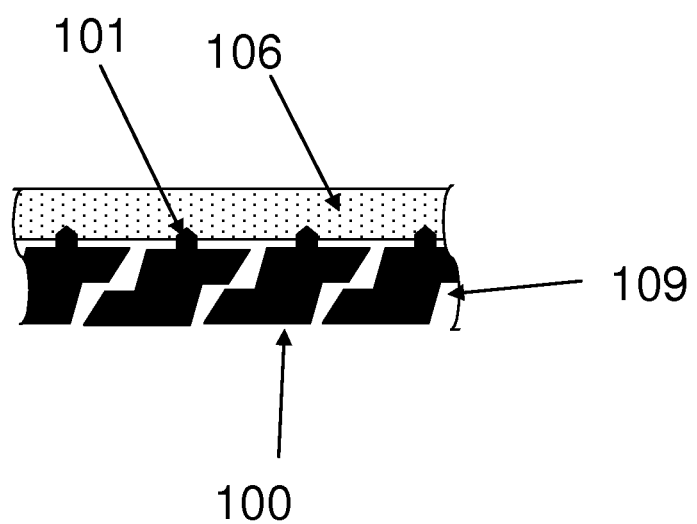
FIG. 6 illustrates a section of another carcass and polymer structure seen in a sectional view of an unbonded flexible pipe of the invention.

FIG. 6 shows a carcass 109 and a polymer structure 106 seen in a sectional view of an unbonded flexible pipe of the invention. The carcass 109 is made from a helically wound elongate carcass reinforcement element with a Z-shaped cross-sectional shape 100, with flange 101. The flange 101 is arranged to face and engage with the polymer structure 106 such that the polymer structure 106 thereby locks carcass reinforcement element windings to each other.

FIG. 7 shows a carcass 119, a polymer structure 116 as well as an internal sealing sheath 115 and an insulating layer 120 seen in a sectional view of an unbonded flexible pipe of the invention. The carcass 119 is made from a helically wound elongate carcass reinforcement element with a rectangular cross-sectional shape 110, with teeth 111. In between the helically wound elongate carcass reinforcement element, an elongate filler element 121 is helically wound. The teeth 111 of the helically wound elongate carcass reinforcement element are arranged to face and engage with the polymer structure 116 such that the polymer structure 115 deforms and thereby locks carcass reinforcement element windings to each other.

What is claimed is:

1. An unbonded flexible pipe having a length and a center axis along said length, the unbonded flexible pipe comprising an internal sealing sheath around said center axis, a carcass arranged inside said internal sealing sheath, and at least one armor arranged around the internal sealing sheath, said carcass is formed by a plurality of not directly interlocked carcass reinforcement element windings along the length of said unbonded flexible pipe wherein said carcass reinforcement element windings are adjacent to a polymer structure, which polymer structure locks said carcass reinforcement element windings relative to each other, wherein each of said carcass reinforcement element windings comprises at least one channel arranged to engage with the polymer structure to lock said plurality of carcass reinforcement element windings mechanically to said polymer structure to prevent relative axial movement therebetween.

2. The unbonded flexible pipe as claimed in claim 1, wherein said plurality of carcass reinforcement element windings do not overlap.

3. The unbonded flexible pipe as claimed in claim 1, wherein said plurality of carcass reinforcement element windings partly overlaps neighboring windings but without any mutual interlocking.

4. The unbonded flexible pipe as claimed in claim 1, wherein said polymer structure comprises a single-layer structure.

5. The unbonded flexible pipe as claimed in claim 1, wherein said polymer structure varies along the length of the pipe with respect to at least one of thickness of the polymer structure, number of layers of the polymer structure, composition of polymer structure, permeability of the polymer structure, hardness of the polymer, tensile modulus (young's modulus) and tensile strength.

6. The unbonded flexible pipe as claimed in claim 1, wherein said polymer structure comprises a multi-layer polymer structure comprising at least 2 layers, wherein the layers of the multi-layer polymer structure are bonded to each other.

7. The unbonded flexible pipe as claimed in claim 6, wherein said polymer structure comprises at least one film layer with a thickness of from about 25 µm to about 1 mm.

8. The unbonded flexible pipe as claimed in claim 1, wherein said polymer structure has a total thickness of at least about ¼ of the total thickness of the carcass.

9. The unbonded flexible pipe as claimed in claim 1, wherein said polymer structure comprises one or more of the materials selected from polyolefins; polyamide; polyimide (PI); polyurethanes; polyureas; polyesters; polyacetals; polyethers; polyoxides; polysulfides; polyacrylates; polyethylene terephthalate (PET); polyether-ether-ketones (PEEK); polyvinyls; polyacrylonitrile; polyetherketoneketone (PEKK); copolymers of the preceding; fluorous polymers; compounds comprising one or more of the above mentioned polymers, and composite materials.

10. The unbonded flexible pipe as claimed in claim 1, wherein said polymer structure is liquid pervious.

11. The unbonded flexible pipe as claimed in claim 1, wherein said polymer structure comprises at least one extruded and liquid impervious layer.

12. The unbonded flexible pipe as claimed in claim 1, wherein said polymer structure is a liquid pervious layer applied between said carcass and said internal sealing sheath.

13. The unbonded flexible pipe as claimed in claim 1, wherein the plurality of carcass reinforcement element windings comprises metal.

14. The unbonded flexible pipe as claimed in claim 1, wherein the plurality of carcass reinforcement element windings comprises composite material comprising one or more polymers selected from thermoset polymers, cross-linked polymers or reinforced polymer.

15. The unbonded flexible pipe as claimed in claim 1, wherein said plurality of carcass reinforcement element windings are wound with an angle to the axis which is at least about 80 degrees, such as at least about 85 degrees, such as up to about 90 degrees.

16. The unbonded flexible pipe as claimed in claim 1, wherein said plurality of carcass reinforcement element windings is chemically or mechanically locked to the polymer structure.

17. The unbonded flexible pipe as claimed in claim 1, wherein said plurality of carcass reinforcement element windings are mechanically locked to said polymer structure in axial direction relative to the unbonded flexible pipe, such that said plurality of carcass reinforcement element windings are prevented from uncontrolled movement in said axial direction relative to said polymer structure.

18. The unbonded flexible pipe as claimed in claim 1, wherein said plurality of carcass reinforcement element windings comprises one or more flanges arranged to lock said plurality of carcass reinforcement element windings mechanically to said polymer structure to prevent relative axial movement there between.

19. The unbonded flexible pipe as claimed in claim 1, wherein said plurality of carcass reinforcement element windings comprises at least one tooth arranged to engage with the polymer structure to lock said plurality of carcass reinforcement element windings mechanically to said polymer structure to prevent relative axial movement there between.

20. The unbonded flexible pipe as claimed in claim 1, wherein said unbonded flexible pipe comprises a support layer, said support layer being at least one of a wound, a folded, and an extruded layer.

21. The unbonded flexible pipe as claimed in claim 20, wherein said support layer is a textile layer or a mesh layer.

22. The unbonded flexible pipe as claimed in claim 20, wherein said support layer is an inner support layer arranged inside said at least one helically wound elongate carcass reinforcement.

23. The unbonded flexible pipe as claimed in claim 1, wherein said unbonded flexible pipe comprises at least one helically wound elongate filler element.

24. The unbonded flexible pipe as claimed in claim 23, wherein said filler element is arranged between said carcass reinforcement element windings.

25. The unbonded flexible pipe as claimed in claim 23, wherein said unbonded flexible pipe comprises a first and a second end, said first and said second end comprises each an end fitting fixed to at least said carcass and said internal sealing sheath, wherein said filler element is not directly fixed to at least one of said end fittings.

26. The unbonded flexible pipe as claimed in claim 1, wherein said at least one armor arranged around the internal sealing sheath comprises at least one layer of one or more helically wound elongate reinforcement elements, said at least one armor preferably comprises at least two layers of helically wound elongate reinforcement elements.

27. The unbonded flexible pipe as claimed in claim 1, wherein said unbonded flexible pipe further comprises an outer sheath, said outer sheath being the outermost polymer sheath.

28. The unbonded flexible pipe as claimed in claim 27, wherein said at least one armor arranged around the internal sealing sheath comprises at least one outer armoring layer arranged between said internal sealing sheath and said outer sheath.

29. The unbonded flexible pipe as claimed in claim 1, wherein said unbonded flexible pipe further comprises one or more sensors comprising an optical fiber.

30. A method of producing an unbonded flexible pipe as claimed in claim 1, the method comprising providing said plurality of carcass reinforcement element windings around said center axis;

surrounding said carcass reinforcement element windings with said polymer structure such that said polymer structure locks said carcass reinforcement element windings relative to each other;

and further applying said at least one armor arranged around the internal sealing sheath.

31. The method of claim 30, wherein said polymer structure is liquid impermeable and said polymer structure constitutes the internal sealing sheath.

32. The method of claim 30, where the polymer structure is liquid permeable, the method further comprising the step of applying the internal sealing sheath around said polymer structure.

* * * * *